United States Patent
Lee et al.

(10) Patent No.: US 10,804,034 B2
(45) Date of Patent: Oct. 13, 2020

(54) CAPACITOR COMPONENT HAVING SECONDARY PHASE MATERIAL CONTAINED IN EXTERNAL ELECTRODE THEREOF

(71) Applicant: SAMSUNG ELECTRO-MECHANICS CO., LTD., Suwon-si, Gyeonggi-do (KR)

(72) Inventors: Jang Yeol Lee, Suwon-si (KR); Joon Hwan Kwag, Suwon-si (KR); Jong Ho Lee, Suwon-si (KR); Myung Jun Park, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 16/219,912

(22) Filed: Dec. 13, 2018

(65) Prior Publication Data

US 2020/0135403 A1 Apr. 30, 2020

(30) Foreign Application Priority Data

Oct. 29, 2018 (KR) .................. 10-2018-0129733

(51) Int. Cl.
| | |
|---|---|
| *H01G 4/232* | (2006.01) |
| *H01G 4/30* | (2006.01) |
| *H01G 4/005* | (2006.01) |
| *H01G 4/12* | (2006.01) |

(52) U.S. Cl.
CPC .......... *H01G 4/2325* (2013.01); *H01G 4/005* (2013.01); *H01G 4/12* (2013.01); *H01G 4/30* (2013.01)

(58) Field of Classification Search
CPC ........ H01G 4/2325; H01G 4/232; H01G 4/30; H01G 4/12
See application file for complete search history.

(56) References Cited

U.S. PATENT DOCUMENTS

| | | | |
|---|---|---|---|
| 2009/0049679 A1* | 2/2009 | Motoki | C25D 3/30 29/602.1 |
| 2011/0007449 A1* | 1/2011 | Seo | H01G 4/232 361/321.2 |
| 2013/0088810 A1 | 4/2013 | Yang et al. | |
| 2016/0027561 A1* | 1/2016 | Inoue | H01G 4/30 338/20 |
| 2016/0027569 A1* | 1/2016 | Inoue | H01F 17/0013 336/192 |
| 2016/0293331 A1* | 10/2016 | Kitamura | H01G 4/30 |
| 2017/0345570 A1* | 11/2017 | Sakatsume | H01G 4/232 |
| 2018/0182549 A1* | 6/2018 | Koide | C04B 35/638 |

FOREIGN PATENT DOCUMENTS

| | | | | |
|---|---|---|---|---|
| JP | 06196351 A | * | 7/1994 | ........... H01G 4/2325 |
| JP | 2012-199597 A | | 10/2012 | |
| KR | 10-2013-0037485 A | | 4/2013 | |

* cited by examiner

*Primary Examiner* — David M Sinclair
(74) *Attorney, Agent, or Firm* — Morgan, Lewis & Bockius LLP

(57) ABSTRACT

A capacitor component includes a body including a dielectric layer and an internal electrode and an external electrode disposed on the body. The external electrode includes an electrode layer connected to the internal electrode, a plating layer disposed on the electrode layer, and a secondary phase material disposed at a boundary between the plating layer and the electrode layer. The secondary phase material contains sulfur (S).

19 Claims, 7 Drawing Sheets

CAPACITOR COMPONENT HAVING SECONDARY PHASE MATERIAL CONTAINED IN EXTERNAL ELECTRODE THEREOF

CROSS-REFERENCE TO RELATED APPLICATION(S)

This application claims benefit of priority to Korean Patent Application No. 10-2018-0129733 filed on Oct. 29, 2018 in the Korean Intellectual Property Office, the disclosure of which is incorporated herein by reference in its entirety.

TECHNICAL FIELD

The present disclosure relates to a capacitor component.

BACKGROUND

A multilayer ceramic capacitor (MLCC), a type of capacitor component, is an important chip component used in industrial areas including communications, computing, home appliances, automobiles, and the like, due to advantages thereof such as compactness, guaranteed high capacitance, and ease of mountability. In detail, an MLCC is a core passive component used in electric, electronic, and information communication devices such as mobile phones, computers, digital televisions (TVs), and the like.

With the growing recent demand for mobile devices, wearable devices, and the like, it is becoming more important to secure humidity resistance reliability of capacitor components, such that the capacitor components are used in various temperatures and environments.

To improve mechanical, electrical, and chemical stability and mountability, an external electrode of an MLCC includes a plating layer disposed on an electrode layer.

However, components, such as a glass of an electrode layer and the like, having poor chemical resistance may be etched by a plating liquid during a plating process of forming a plating layer. Alternatively, heat and humidity resistance reliabilities may be degraded by internal defects occurring when the plating liquid penetrates into a capacitor body through a portion of an electrode layer in which the electrode layer is disconnected.

SUMMARY

An aspect of the present disclosure is to provide a capacitor component having improved heat and humidity resistance reliabilities.

According to an aspect of the present disclosure, a capacitor component includes a body including a dielectric layer and an internal electrode and an external electrode disposed on the body. The external electrode includes an electrode layer connected to the internal electrode, a plating layer disposed on the electrode layer, and a secondary phase material disposed at a boundary between the plating layer and the electrode layer. The secondary phase material contains sulfur (S).

The sulfur (S) may be contained in the secondary phase material as a compound with at least one selected from the group consisting of tin (Sn), copper (Cu), nickel (Ni), barium (Ba), aluminum (Al), silicon (Si), and oxygen (O).

The secondary phase material may occupy 2 to 50 area % of the boundary between the electrode layer and the plating layer.

The electrode layer may include a conductive metal and a glass.

The conductive metal may include at least one selected from the group consisting of copper (Cu), palladium (Pd), and silver (Ag).

The electrode layer may include a sintered electrode layer, including a conductive metal and a glass, and a conductive resin layer, disposed on the sintered electrode layer, including a conductive metal and a resin.

The conductive metal contained in the sintered electrode layer may include at least one selected from the group consisting of copper (Cu), palladium (Pd), and silver (Ag).

The conductive metal contained in the conductive resin layer may include at least one selected from the group consisting of copper (Cu), silver (Ag), nickel (Ni), and alloys thereof, and the resin contained in the conductive resin layer may include an epoxy-based resin.

The plating layer may include a first plating layer and a second plating layer disposed on the first plating layer. The first plating layer may include at least one selected from the group consisting of nickel (Ni), copper (Cu), palladium (Pd), and silver (Ag), and the second plating layer may include tin (Sn).

The electrode layer may have a thickness of 1 to 10 micrometers, the first plating layer may have a thickness of 1 to 5 micrometers, and the second plating layer may have a thickness of 1 to 5 micrometers.

The dielectric layer may have a thickness of 0.4 micrometer or less, and the internal electrode may have a thickness of 0.4 micrometer or less.

The internal electrode may include first and second internal electrodes. The body may include a capacitance forming portion, in which capacitance is formed, including the first and second internal electrodes disposed to face each other with the dielectric layer interposed therebetween, and cover portions disposed above and below the capacitance forming portion. Each of the cover portions may have a thickness of 20 micrometers or less.

The capacitor component may have a length of 0.4 millimeter or less and a width of 0.2 millimeter or less.

According to an aspect of the present disclosure, a capacitor component includes a body including a dielectric layer and an internal electrode; and an external electrode disposed on the body. The external electrode includes an electrode layer connected to the internal electrode; a plating layer disposed on the electrode layer; and a plurality of patterns, made of a secondary phase material containing sulfur (S), disposed between the electrode layer and the plating layer and spaced apart from each other.

The sulfur (S) may be contained in the secondary phase material as a compound with at least one selected from the group consisting of tin (Sn), copper (Cu), nickel (Ni), barium (Ba), aluminum (Al), silicon (Si), and oxygen (O).

The electrode layer may include a conductive metal and a glass.

The electrode layer may include a sintered electrode layer, including a conductive metal and a glass, and a conductive resin layer, disposed on the sintered electrode layer, including a conductive metal and a resin.

The dielectric layer may have a thickness of 0.4 micrometer or less, and the internal electrode may have a thickness of 0.4 micrometer or less.

The plurality of patterns may be randomly distributed between the electrode layer and the plating layer.

BRIEF DESCRIPTION OF DRAWINGS

The patent or application file contains at least one drawing executed in color. Copies of this patent or patent application publication with color drawing(s) will be provided by the Office upon request and payment of the necessary fee.

The above and other aspects, features, and advantages of the present disclosure will be more clearly understood from the following detailed description, taken in conjunction with the accompanying drawings, in which.

DETAILED DESCRIPTION

Figure 1:
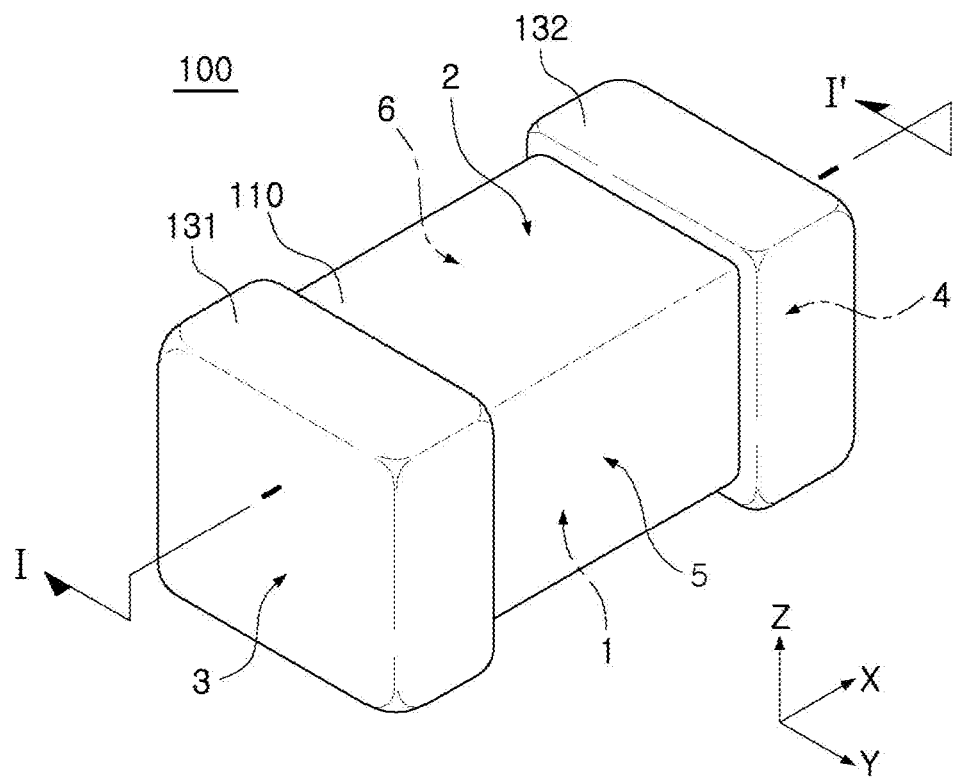
FIG. 1 is a perspective view of a capacitor component according to an exemplary embodiment in the present disclosure.

Hereinafter, embodiments in the present disclosure will be described as follows with reference to the attached drawings. The present disclosure may, however, be embodied in many different forms and should not be construed as being limited to the embodiments set forth herein. Rather, these embodiments are provided so that this disclosure will be thorough and complete, and will fully convey the scope of the present disclosure to those skilled in the art. In the drawings, the shapes and dimensions of elements may be exaggerated for clarity, and the same reference numerals will be used throughout to designate the same or like components.

Also, elements having the same function within a scope of the same concept illustrated in drawings of respective embodiments will be described by using the same reference numerals. Terms used in the present specification are for explaining the embodiments rather than limiting the present invention. Unless explicitly described to the contrary, a singular form includes a plural form in the present specification. The word "comprise" and variations such as "comprises" or "comprising," will be understood to imply the inclusion of stated constituents, steps, operations and/or elements but not the exclusion of any other constituents, steps, operations and/or elements.

In drawings, an X direction may be defined as an L direction or a length direction, a Y direction may be defined as a W direction or a width direction, and a Z direction may be defined as a laminated direction, a T direction or a thickness direction.

Capacitor Component

Figure 2:
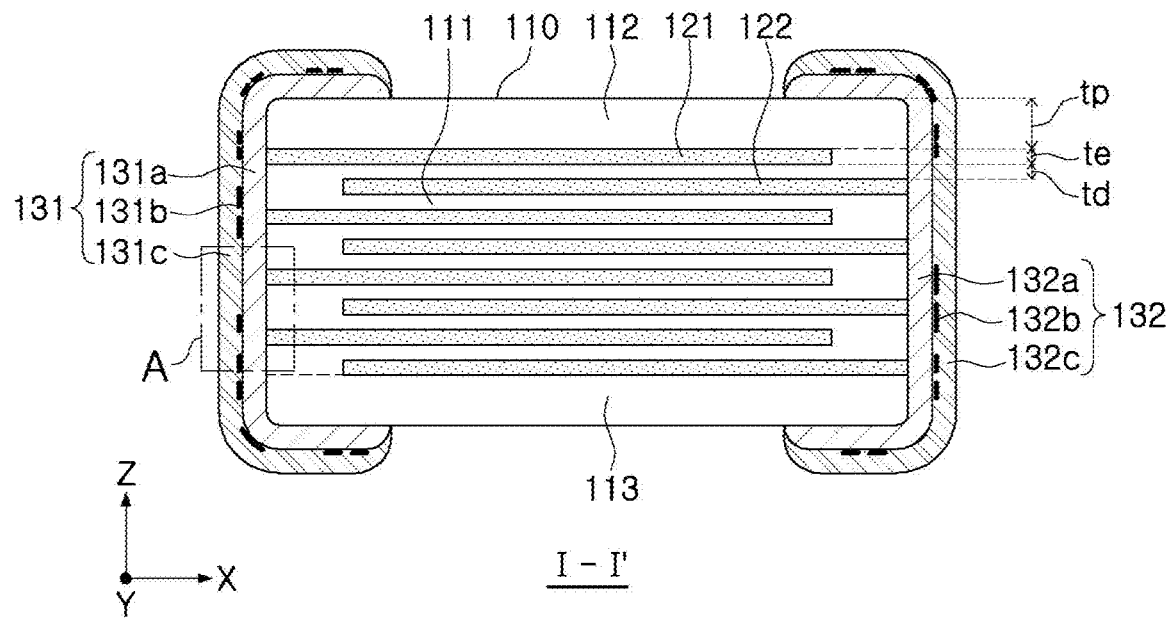
FIG. 2 is a cross-sectional view taken along line I-I' in FIG. 1.
Figure 3A:
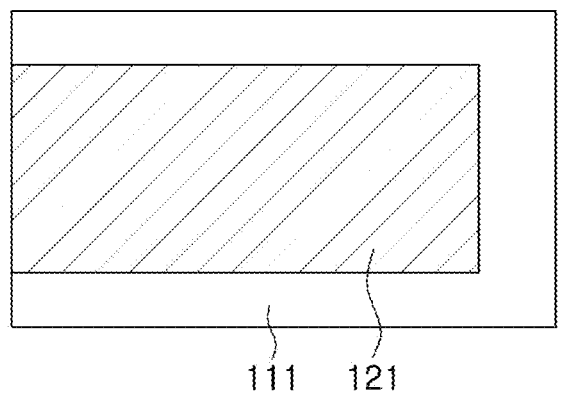
FIGS. 3A and 3B illustrate a ceramic green sheet on which an internal electrode for manufacturing a body of a capacitor component is printed.
Figure 3B:
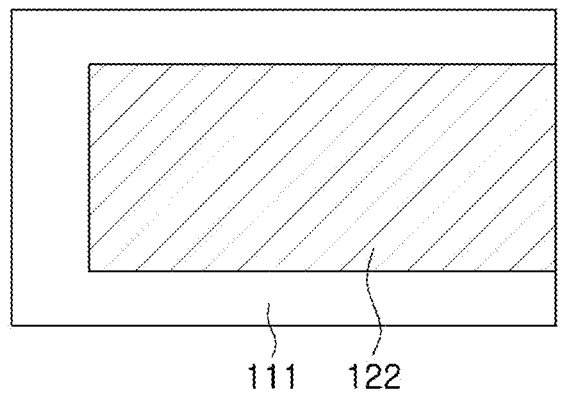
Figure 4:
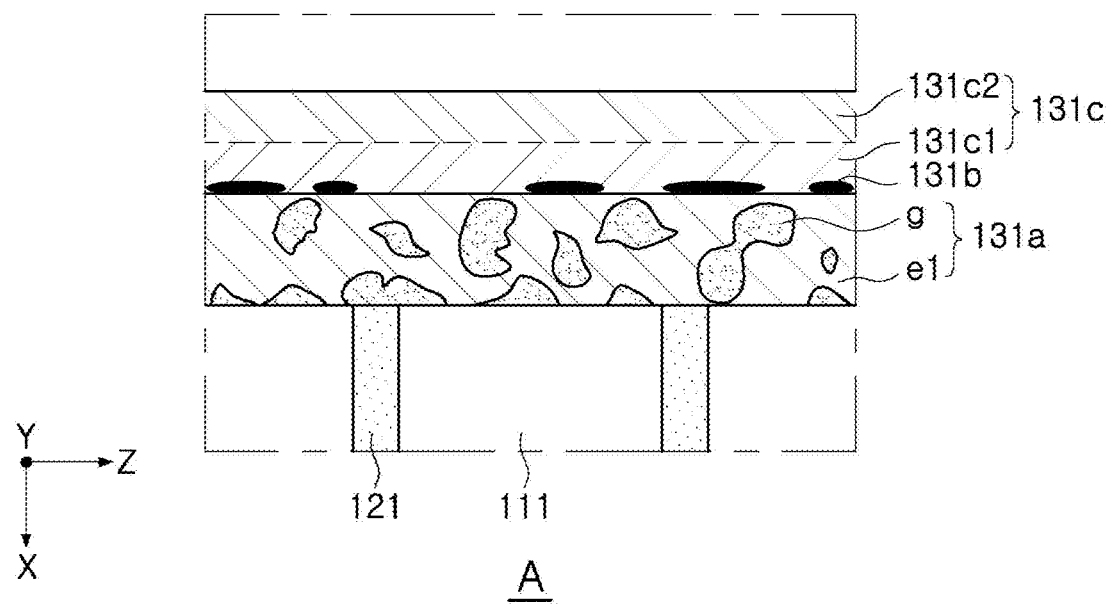
FIG. 4 is an enlarged view of region 'A' in FIG. 2 and illustrates an external electrode according to an exemplary embodiment in the present disclosure.

FIG. 1 is a perspective view of a capacitor component according to an exemplary embodiment in the present disclosure, and FIG. 2 is a cross-sectional view taken along line I-I' in FIG. 1. FIGS. 3A to 3B illustrate a ceramic green sheet on which an internal electrode for manufacturing a body of a capacitor component is printed. FIG. 4 is an enlarged view of region 'A' in FIG. 2 and illustrates an external electrode according to an exemplary embodiment in the present disclosure.

Referring to FIGS. 1 to 4, a capacitor component 100 according to an exemplary embodiment includes a body 110 including dielectric layers 111 and internal electrodes 121 and 122, and external electrodes 131 and 132 disposed on external surfaces of the body 100. The external electrodes 131 and 132 include electrode layers connected to the internal electrodes 111, plating layers disposed on the electrode layers, respectively, and a secondary phase material disposed at boundaries between the first and second internal electrodes 121 and 122 and the dielectric layers 111. The secondary phase material contains sulfur (S).

In the body 110, the dielectric layers 111 and the internal electrodes 121 and 122 are alternately laminated.

The body 110 is not limited in shape, but may have a hexahedral shape or a shape similar thereto. Due to shrinkage of ceramic powder particles included in the body 110 during sintering, the body 110 may have a substantially hexahedral shape rather than a hexahedral shape having complete straight lines.

The body 110 may have first and second surfaces 1 and 2 disposed to oppose each other in a thickness direction (a Z direction), third and fourth surfaces 3 and 4 connected to the first and second surfaces 1 and 2 and disposed to oppose each other in a length direction (an X direction), and fifth and sixth surfaces connected to the first and second surfaces 1 and 2 as well as to the third and fourth surfaces 3 and 4 and disposed to oppose each other in a width direction (a Y direction).

The plurality of dielectric layers 111 constituting the body 110 is in a sintered state, and may be integrated with each other such that boundaries therebetween may not be readily apparent without using a scanning electron microscope (SEM).

A raw material forming the dielectric layers 111 is not limited as long as sufficient capacitance can be obtained, but may be, for example, barium titanate ($BaTiO_3$)-based powder particles. In the raw material forming the dielectric layers 111, various ceramic additives, organic solvents, plasticizers, binders, dispersing agents, and the like, may be added to powder particles such as barium titanate ($BaTiO_3$) powder particles or the like, according to the purpose of the present disclosure.

On the other hand, it is unnecessary to limit a thickness td of the dielectric layer 111.

However, when a dielectric layer is formed to have a thickness less than 0.6 micrometers (μm), in detail, a thickness of 0.4 μm or less, humidity resistance reliability may be degraded.

As will be described later, according to an exemplary embodiment, a secondary phase material containing sulfur (S) is disposed at a boundary between a plating layer and an electrode layer to improve a level of compactness and to suppress disconnection of the plating layer. Therefore, humidity resistance reliability may be sufficiently secured even when the dielectric layer has a thickness less than 0.4 μm or less.

As a result, a humidity resistance reliability improvement effect may become noticeable when the thickness of the dielectric layer 111 is 0.4 μm or less.

The thickness of the dielectric layer 111 may refer to an average thickness of the dielectric layer 111 interposed between the first and second internal electrodes 121 and 122.

The average thickness of the dielectric layer 111 may be measured by scanning a cross section of the body 110 in length-thickness directions (an L-T cross section) using a scanning electron microscope (SEM).

For example, the average thickness of the dielectric layer 111 may be obtained by measuring thickness values at 30 equidistant points of the dielectric layer 111 in the length direction thereof, with respect to any dielectric layer extracted from an image obtained by scanning a cross section of the body 110 in length-thickness directions (an L-T cross section).

The thickness values at 30 equidistant points may be measured in a capacitance forming portion in which the first and second internal electrodes 121 and 122 overlap each other.

In this case, the capacitor component 100 may include a capacitance forming portion, disposed in the body 110, in which capacitance is formed by including first and second internal electrodes 122 disposed on each other with each of the dielectric layers interposed therebetween, and cover portions 112 and 113 disposed above and below the capacitance forming portion.

The cover portions 112 and 113 do not include an internal electrode, and may include the same material as the dielectric layer 111. For example, the cover portions 112 and 113 may include a ceramic material such as a barium titanate ($BaTiO_3$)-based ceramic material.

The cover portions 112 and 113 may be formed by vertically laminating a single dielectric layer or two or more dielectric layers on top and bottom surfaces of the capacitance forming portion, respectively, and may basically serve to prevent an internal electrode from being damaged by physical or chemical stress.

It is unnecessary to limit thicknesses of the cover portions 112 and 113. However, the respective cover portions 112 and 113 may have a thickness tp of 20 μm or less to readily achieve miniaturization and high capacitance of the capacitor component 100. In this case, a humidity permeation path may be reduced to degrade humidity resistance reliability.

As will be described later, according to an exemplary embodiment, a secondary phase material containing sulfur (S) may be disposed at a boundary between a plating layer and an electrode layer to improve a level of compactness of an external electrode and to suppress disconnection of the plating layer. Therefore, humidity resistance reliability may be sufficiently secured even when the thickness tp the respective cover portions 112 and 113 is 20 μm or less.

As a result, a humidity resistance reliability improvement effect may become noticeable when the thickness of the dielectric layer 111 is 0.4 μm or less.

The internal electrodes 121 and 122 are alternately laminated with dielectric layers, and may include first and second internal electrodes 121 and 122. The first and second internal electrodes 121 and 122 may be alternately disposed to face each other with each of the dielectric layers 111, constituting the body 110, interposed therebetween and may be exposed to the third and fourth surfaces 3 and 4, respectively.

Referring to FIG. 2, the first internal electrode 121 may be spaced apart from the fourth surface 4 and may be exposed through the third surface 3, and the second internal electrode 122 may be spaced apart from the third surface 3 and may be exposed through the fourth surface 4.

The first and second internal electrodes 121 and 122 may be electrically insulated from the dielectric layers 111 interposed therebetween. Referring to FIGS. 3A to 3B, the body 110 may be formed by alternately laminating a ceramic green sheet of FIG. 3A, on which the first internal electrode 121 is printed, and a ceramic green sheet of FIG. 3B, on which the second internal electrode 122 is printed, and sintering the laminated ceramic green sheets of FIGS. 3A and 3B.

A material of the first and second internal electrodes 121 and 122 is not limited. For example, the first and second internal electrodes 121 and 122 may be formed using a conductive paste including at least one of a noble metal such as palladium (Pd), a palladium-silver (Pd—Ag) alloy, nickel (Ni), and copper (Cu).

A printing method of the conductive paste may be a screen printing method, a gravure printing method or the like, but is not limited thereto.

It is unnecessary to limit thicknesses of the first and second internal electrodes 121 and 122. However, the respective first and second internal electrodes 121 and 122 may have a thickness to of 0.4 μm or less to readily achieve miniaturization and high capacitance of the capacitor component 100.

The thickness of the respective first and second internal electrodes 121 and 122 may refer to an average thickness of the respective first and second internal electrodes 121 and 122.

The average thickness of the respective first and second internal electrodes 121 and 122 may be measured by scanning a cross section of the body 110 in length-thickness directions (an L-T cross section) using a scanning electron microscope (SEM).

For example, the average thickness of the dielectric layer 111 may be obtained by measuring thickness values at 30 equidistant points of the respective first and second electrodes 121 and 122 in the length direction thereof, with respect to any dielectric layer extracted from an image obtained by scanning a cross section of the body 110 in length-thickness directions (an L-T cross section).

The thickness values at 30 equidistant points may be measured in a capacitance forming portion in which the first and second internal electrodes 121 and 122 overlap each other.

The external electrodes 131 and 132 are disposed on external surfaces of the body 100, respectively, and include electrode layers 131a and 132a, secondary phase materials 131b and 132b, and plating layers 131c and 132c, respectively.

The external electrodes 131 and 132 may include first and second external electrodes 131 and 132, connected to the first and second internal electrodes 121 and 122, respectively.

The first and second external electrodes 131 and 132 may extend from the third and fourth surfaces 3 and 4 of the body 110 to portions of the first and second surfaces 1 and 2 of the body 110, respectively. Also, the first and second external electrodes 131 and 132 may extend from the third and fourth surfaces 3 and 4 of the body 110 to portions of the fifth and sixth surfaces 5 and 6 of the body 110, respectively.

Hereinafter, the first external electrode 131 will mainly be described, but the description thereof may be identically or similarly applied to the second external electrode 132.

To improve mechanical, electrical, and chemical stability and mountability, an external electrode of a multilayer ceramic capacitor includes a plating layer disposed on an electrode layer.

However, components, such as a glass of an electrode layer and the like, having poor chemical resistance may be etched by a plating liquid during a plating process of forming a plating layer. Alternatively, heat and humidity resistance reliabilities may be degraded by internal defects occurring when the plating liquid penetrates into a capacity body through a portion in which the electrode layer is disconnected.

Figure 7A:
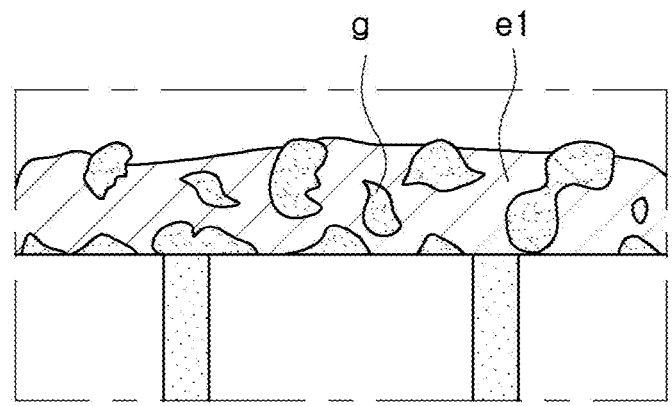
FIGS. 7A to 7C are schematic diagrams illustrating pores formed by erosion of a glass included in an electrode layer as a plating process is performed.
Figure 7B:
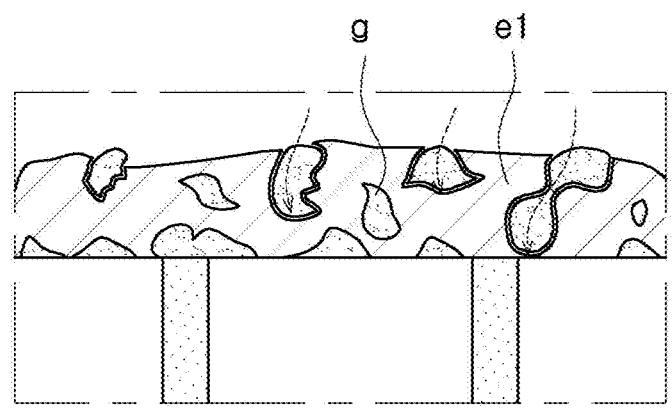
Figure 7C:
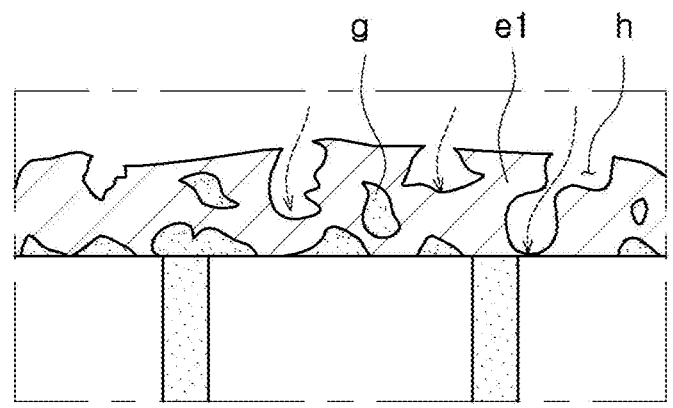

FIGS. 7A to 7C are schematic diagrams illustrating pores formed by erosion of a glass included in an electrode layer as a plating process is performed. FIG. 7A is a schematic diagram of an electrode layer before plating, FIG. 7B is a schematic diagram of an electrode layer during plating, and FIG. 7C is a schematic diagram of an electrode after plating.

Referring to FIGS. 7A to 7C, materials, such as a glass and the like, having poor chemical resistance may be etched by a plating liquid to form pores has a plating process is performed. Accordingly, heat and humidity resistance reliabilities may be degraded by internal defects occurring when the plating liquid penetrates into a capacity body through a portion in which the electrode layer is disconnected. The pores h serve as paths through which the plating liquid or humidity permeate. As a result, heat and humidity resistance reliabilities are degraded.

According to an exemplary embodiment, in the case in which secondary phase materials 131b and 132b containing sulfur (S) are disposed at boundaries between the electrode layers 131a and 132a and the plating layers 131c and 132c of the external electrodes 131 and 132, the secondary phase materials 131b and 132b may serve as protective layers to suppress erosion of the electrode layers 131a and 132a and to reduce disconnection of the electrode layers 131a and 132a. Thus, heat and humidity resistance reliabilities may be improved.

The secondary phase materials 131b and 132b containing sulfur (S) may have improved chemical resistance against a plating liquid to prevent materials having poor chemical resistance, such as a glass included in the electrode layers 131a and 132a and the like, from being etched. Thus, a level of compactness of the external electrodes 131 and 132 may be improved.

The secondary phase material 131b and 132b contain sulfur (S), and sulfur (S) may form a compound with a glass component, a metal component reduced during plating, or an additive component of a plating process. For example, sulfur (S) may be contained in a secondary phase material while forming a compound with at least one selected from the group consisting of tin (Sn), copper (Cu), nickel (Ni), barium (Ba), aluminum (Al), silicon (Si), and oxygen (O).

In this case, the secondary phase materials 131b and 132b may be sulfate-based secondary phase materials.

The secondary phase materials 131b and 132b may be 2 to 50 area % of the boundaries between the electrode layers 131a and 132a and the plating layers 131c and 132c. The area % of the secondary phase materials 131b and 132b may be determined in consideration of an area of a glass protruding to surfaces of the electrodes 131a and 132a before formation of the plating layers 131c and 132c. Each of the secondary phase materials 131b and 132b may include a plurality of patterns spaced apart from each other. The plurality of patterns may be randomly distributed.

When the secondary phase materials 131b and 132b is less than 2 area % of the boundaries between the electrode layers 131a and 132a and the plating layers 131c and 132c, the secondary phase materials 131b and 132b may not sufficiently serve as protective layers to suppress erosion of the electrode layers 131a and 132a in view of an area of the glass protruding to the surfaces of the electrode layers 131a and 132a before plating. In addition, it may be difficult to reduce disconnection of the electrode layers 131a and 132a themselves. On the other hand, when the secondary phase materials 131b and 132b is greater than 50 area % of the boundaries between the electrode layers 131a and 132a and the plating layers 131c and 132c, electrical connectivity may be reduced and disconnection of the plating layers 131c and 132c may occur.

A method of forming the secondary phase materials 131b and 132b is not limited. For example, the secondary phase materials 131b and 132b may be formed using chemical and electrical pretreatments before a plating process. Alternatively, the secondary phase materials 131b and 132b may be formed by changing a composition of a plating liquid during a plating process.

The chemical pretreatment before a plating process may employ a method of inducing reduction/precipitation reactions to form a secondary phase material after immersing a body, including an electrode layer formed therein, in a sulfur-containing pretreatment solution, or a method of adding a metal compound or an additive reactable with a glass to form a secondary phase material.

The electrical pretreatment before a plating process may employ a method of introducing a sulfur-containing electrolyte and an additive to form a secondary phase material in a seed plating manner.

In addition, a secondary phase material may be formed during a plating process by changing a compositing of a plating liquid in such a manner that a ratio of a sulfur additive or a sulfur solvent is 1 to 60 vol % of the total plating solution.

The electrode layers 131a and 132a serve to mechanically bond the body 110 to the external electrodes 131 and 132, and serve to electrically and mechanically bond the internal electrodes 121 and 122 to the external electrodes 131 and 132.

The electrode layers 131a and 132a may be formed using any material as long as it has an electrical conductivity, such as a metal or the like. A detailed material may be determined in consideration of electrical characteristics, structural stability, and the like.

In the case in which the electrode layers 131a and 132a include a conductive metal e1 and a glass g, pores may be easily formed in the electrode layers 131a and 132a because the glass g has poor chemical resistance against a plating liquid. In this case, the pores act as paths, through which the plating liquid or humidity permeate, to degrade heat and humidity resistance reliabilities.

Accordingly, a heat and humidity resistance reliability improvement effect may be more noticeable in the case in which the electrode layers 131a and 132a includes the conductive metal e1 and the glass g.

The glass g serves to mechanically bond the body 110 to the external electrodes 131 and 132, and the conductive metal e1 serves to electrically and mechanically bond the internal electrodes 121 and 122 to the external electrodes 131 and 132. The conductive metal e1 may be at least one selected from the group consisting of copper (Cu), palladium (Pd), and silver (Ag).

Each of the electrode layers 131a and 132a may have a thickness of 1 μm to 10 μm.

Figure 5:
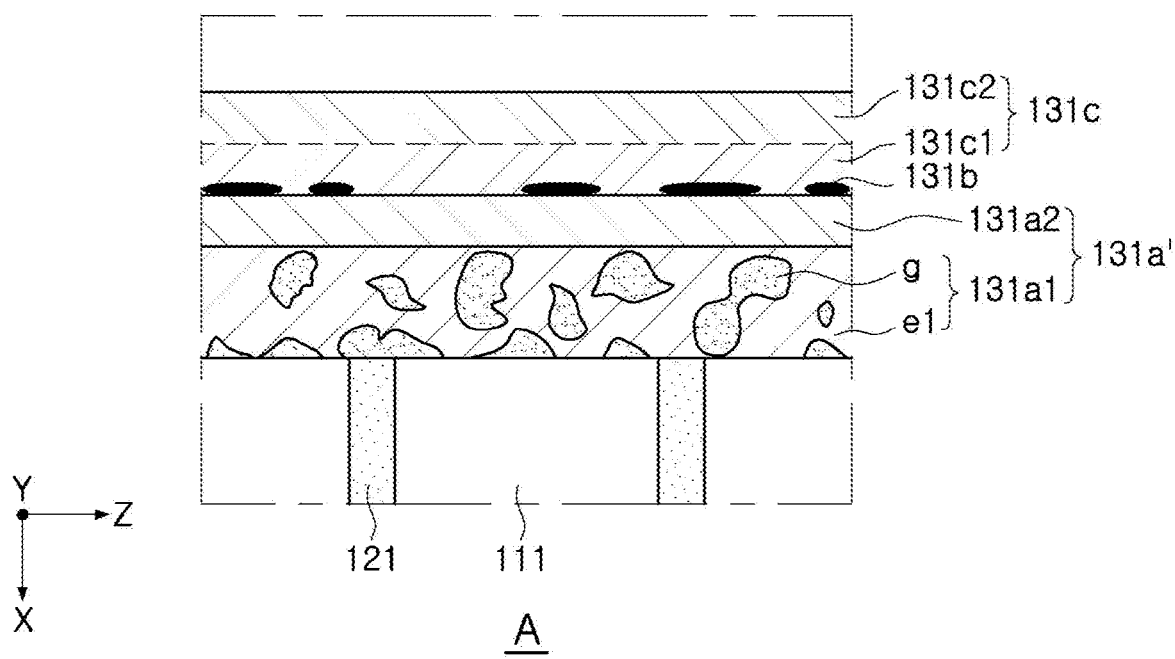
FIG. 5 is an enlarged view of region 'A' in FIG. 2 and illustrates an external electrode according to another exemplary embodiment in the present disclosure.

Referring to FIG. 5, according to another exemplary embodiment, an electrode layer 131a' may include a sintered electrode layer 131a1 including a conductive metal e1 and a glass g and a conductive resin layer 131a2, disposed on the sintered electrode layer 131a1, including a conductive metal and a base resin. Since the conductive resin layer 131a2 has higher humidity and permeability than the sintered electrode layer 131a1, a conductive resin layer 131a2 may be disposed on the sintered layer 131a1 to prevent a plating liquid from permeating into the body 110 during a plating process or to prevent humidity resistance reliability of a completed chip from being degraded.

The base resin included in the conductive resin layer 131a2 may have adhesion and impact absorption, and is not limited as long as it is mixed with conductive metal powder particles to prepare a paste and may include, for example, an epoxy-based resin.

The conductive metal included in the conductive resin layer 131a2 is not limited as long as it is electrically connected to the sintered electrode layer 131a1 and may include, for example, at least one selected from the group consisting of copper (Cu), silver (Ag), nickel (Ni), and alloys thereof. The conductive resin layer 131a2 may not contain glass used in the sintered electrode layer 131a1. In a case in which the glass used in the sintered electrode layer 131a1 is also used to form the conductive resin layer 131a2, a density of the glass in the sintered electrode layer 131a1 may be higher than that of the glass in the conductive resin layer 131a2.

The plating layers 131c and 132c may serve to mechanical, electrical, and chemical stability and mountability.

The electrode layers 131c and 132c may include first plating layers 131c1 and 132c1 to secure the mechanical, electrical, and chemical stability and second plating layers 131c2 and 132c2, disposed on the first plating layers 131c1 and 132c1, to improve mountability.

Each of the first plating layers 131c1 and 132c2 may include at least one selected from the group consisting of nickel (Ni), copper (Cu), palladium (Pd), and silver (Ag) and may be, for example, a nickel (Ni) plating layer.

Each of the second plating layers 132c1 and 132c2 may include a low-melting point metal and may be, for example, a tin (Sn) plating layer.

A method of forming a plating layer is not limited, and the plating layer may be formed using electroplating or electroless plating. However, when a secondary phase material is formed during a plating process, the plating process may be performed by changing a composition in such a manner that a ratio of sulfur additive or a sulfur solvent is 1 to 60 vol % of the entire plating liquid.

In this case, each of the first plating layers 131c1 and 132c1 may have a thickness of 1 μm to 5 μm, and each of the second plating layers 132c1 and 132c2 may have a thickness of 1 μm to 5 μm.

It is unnecessary to limit a size of the capacitor component 100.

To achieve miniaturization as well as high capacitance, dielectric layers and internal electrodes should be thinned to increase the lamination number thereof. For this reason, a heat and humidity resistance reliability improvement effect according to the present disclosure may become noticeable in a capacitor component having a size of 0404 (0.4 mm×0.2 mm) or less.

For example, the capacitor component may have a length of 0.4 mm or less and a width of 0.2 mm or less.

Experimental Example

Table (1) shows an experimental result to confirm an effect obtained by a secondary phase material disposed between an electrode layer and a plating layer.

According to Inventive Example, an electrode layer including copper (Cu) and a glass was formed in a body. The electrode layer was immersed in a pretreatment solution in which an acid-based additive including a sulfur element was contained at a concentration of 5% or less. A nickel (Ni) plating layer and a tin (Sn) plating layer were sequentially formed on the electrode layer using electroplating. Each of the Ni and Sn plating layers had a thickness of 4 μm.

According to Inventive Example, an electrode layer including copper (Cu) and a glass was formed in a body. A nickel (Ni) plating layer and a tin (Sn) plating layer were sequentially formed on the electrode layer using electroplating without performing the above-mentioned pretreatment of Inventive Example. Each of the Ni and Sn plating layers had a thickness of 4 μm.

The number of samples in which disconnection of a plating layer occurred, among 100 samples for each of Present and Comparative Examples, is shown in Table (1). The disconnection of a plating layer was measured by observing cross sections in length and thickness directions in a central portion of each sample in a width direction.

In addition, the number of samples having poor soldering, poor high temperature/high voltage reliability, and poor humidity resistance reliability, among 400 samples for each of Present and Comparative Examples, is shown in Table (1).

The high temperature/high voltage reliability was measured by applying a voltage of two times as high as a reference voltage for 12 hours at a temperature of 150 degrees Celsius and comparing an insulation resistance value with an initial value. A sample deteriorated by 1.0E+1 or more was determined to be defective.

The humidity resistance reliability was measured by applying a reference voltage for 12 hours at a temperature of 85 degrees Celsius and a relative humidity of 85% and comparing an insulation resistance with an initial value. A sample deteriorated by 1.0E+1 or more was determined to be defective.

TABLE (1)

| | Secondary Phase Material | Disconnection of Plating Layer | Poor Soldering | Poor High Temperature/ High Voltage Reliability | Poor Humidity Resistance Reliability |
|---|---|---|---|---|---|
| Inventive Example | ○ | 0/100 | 0/400 | 0/400 | 0/400 |
| Comparative Example | x | 11/100 | 2/400 | 7/400 | 2/400 |

In the case of Comparative Example in which there is no secondary phase material at a boundary between an electrode layer and a nickel (Ni) plating layer, disconnection of a plating layer, poor soldering, poor high temperature/high voltage reliability, and poor humidity resistance reliability occurred.

Meanwhile, in the case of Inventive Example in which there is a secondary phase material at a boundary between an electrode layer and a nickel (Ni) plating layer, disconnection of a plating layer, poor soldering, poor high temperature/high voltage reliability, and poor humidity resistance reliability did not occur.

FIGS. 6A to 6F illustrate a result obtained by analyzing an external electrode of an inventive example using a scanning electron microscope (SEM).

Figure 6A:
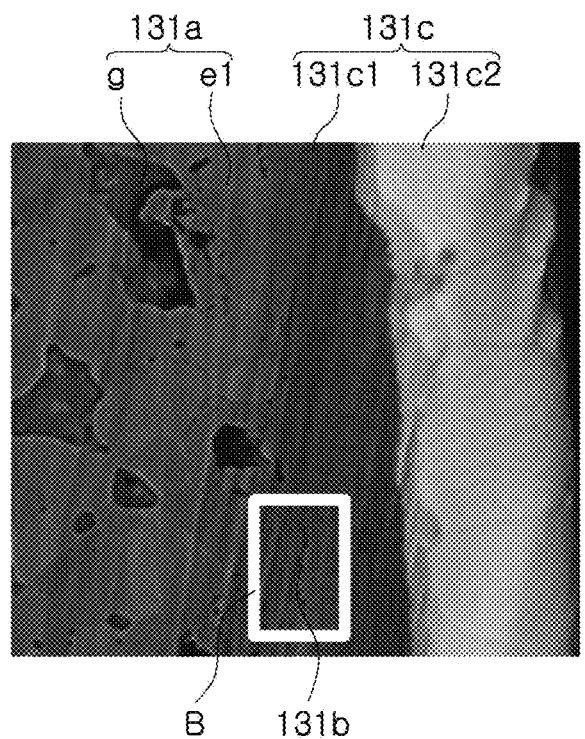
FIGS. 6A to 6F illustrate a result obtained by analyzing an external electrode of an inventive example using a scanning electron microscope (SEM)

FIG. 6A is an image of a cross section, in length and thickness directions, captured in a central portion in a width direction using a scanning electron microscope (SEM).

Figure 6B:
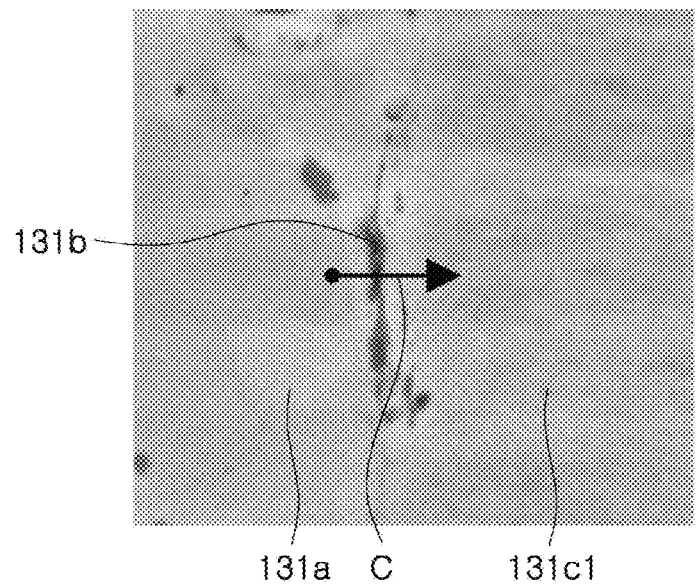

FIG. 6B is an enlarged view of region 'B' in FIG. 6A.

Figure 6C:
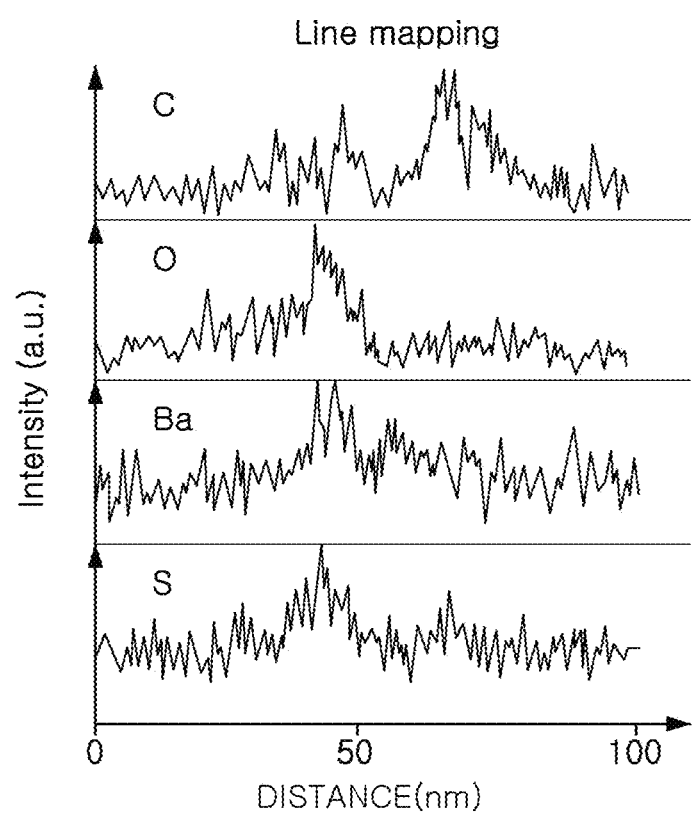

FIG. 6C illustrates a result of line mapping analysis for carbon (C), oxygen (O), barium (Ba), and sulfur (S) along line 'C' in FIG. 6B. As can be seen from FIG. 6C, in Inventive Example, there is a barium sulfate-based secondary phase material at a boundary between an electrode layer and a nickel (Ni) plating layer.

Figure 6D:
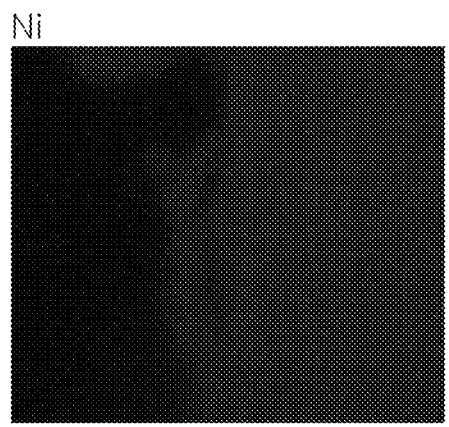
Figure 6E:
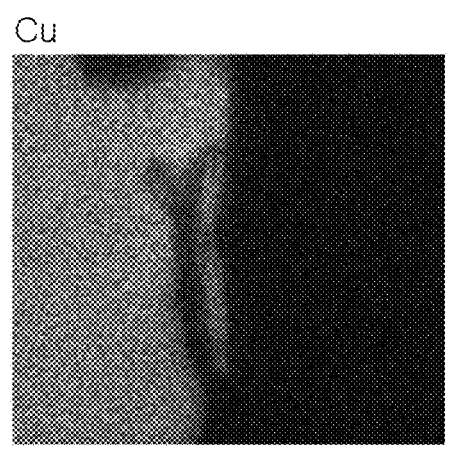
Figure 6F:
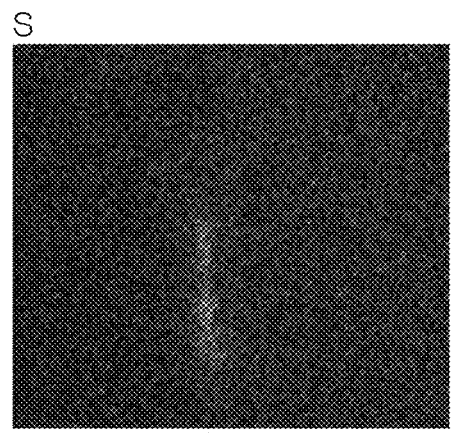

FIG. 6D illustrates a result of 2D mapping analysis for nickel (Ni) in region 'B' in FIG. 6A. FIG. 6D illustrates a result of 2D mapping analysis for copper (Cu) in region 'B' in FIG. 6A. FIG. 6D illustrates a result of 2D mapping analysis for sulfur (S) in region 'B' in FIG. 6A. In the present disclosure, '2D mapping' refers to a method of analyzing a distribution of each element based on a color thereof. In FIGS. 6D to 6F, the 2D mapping means that the higher brightness of a region, the higher a content of a corresponding element.

As can be seen from FIGS. 6D to 6F, there is a secondary phase material containing sulfur (S) at a boundary between an electrode layer and a nickel (Ni) plating layer.

As described above, according to an exemplary embodiment, a secondary phase material containing sulfur (S) is disposed at a boundary between a plating layer and an electrode layer to improve a level of compactness of an external electrode and to suppress disconnection of the plating layer. As a result, a capacitor component having improved heat and humidity resistance reliabilities may be provided.

While exemplary embodiments have been shown and described above, it will be apparent to those skilled in the art that modifications and variations could be made without departing from the scope of the present invention as defined by the appended claims.

What is claimed is:

1. A capacitor component comprising:
a body including a dielectric layer and an internal electrode exposed from an end surface of the body; and
an external electrode disposed on the end surface of the body,
wherein the external electrode comprises:
an electrode layer connected to the internal electrode and disposed on the end surface of the body;
a plating layer disposed on the electrode layer and disposed on the end surface of the body; and
a secondary phase material disposed at a boundary between the plating layer and the electrode layer and disposed on the end surface of the body,
the secondary phase material contains sulfur (S), and
the sulfur (S) is contained in the secondary phase material as a compound with at least one selected from the group consisting of tin (Sn), copper (Cu), nickel (Ni), barium (Ba), aluminum (Al), silicon (Si), and oxygen (O).

2. The capacitor component of claim 1, wherein the secondary phase material occupies 2 to 50 area % of the boundary between the electrode layer and the plating layer.

3. The capacitor component of claim 1, wherein the electrode layer includes a conductive metal and a glass.

4. The capacitor component of claim 3, wherein the conductive metal includes at least one selected from the group consisting of copper (Cu), palladium (Pd), and silver (Ag).

5. The capacitor component of claim 1, wherein the electrode layer includes a sintered electrode layer, including a conductive metal and a glass, and a conductive resin layer, disposed on the sintered electrode layer, including a conductive metal and a resin.

6. The capacitor component of claim 5, wherein the conductive metal contained in the sintered electrode layer includes at least one selected from the group consisting of copper (Cu), palladium (Pd), and silver (Ag).

7. The capacitor component of claim 5, wherein the conductive metal contained in the conductive resin layer includes at least one selected from the group consisting of copper (Cu), silver (Ag), nickel (Ni), and alloys thereof, and the resin contained in the conductive resin layer includes an epoxy-based resin.

8. The capacitor component of claim 1, wherein the plating layer includes a first plating layer and a second plating layer disposed on the first plating layer, and
the first plating layer includes at least one selected from the group consisting of nickel (Ni), copper (Cu), palladium (Pd), and silver (Ag), and the second plating layer includes tin (Sn).

9. The capacitor component of claim 8, wherein the electrode layer has a thickness of 1 to 10 micrometers, the first plating layer has a thickness of 1 to 5 micrometers, and the second plating layer has a thickness of 1 to 5 micrometers.

10. The capacitor component of claim 1, wherein the dielectric layer has a thickness of 0.4 micrometer or less, and the internal electrode has a thickness of 0.4 micrometer or less.

11. The capacitor component of claim 1, wherein the internal electrode includes first and second internal electrodes,
the body includes a capacitance forming portion, in which capacitance is formed by including the first and second internal electrodes disposed to face each other with the dielectric layer interposed therebetween, and cover portions disposed above and below the capacitance forming portion, and
each of the cover portions has a thickness of 20 micrometers or less.

12. The capacitor component of claim 1, the capacitor component having a length of 0.4 millimeter or less and a width of 0.2 millimeter or less.

13. The capacitor component of claim 1, wherein the external electrode extends from the end surface of the body onto a side surface of the body connected to the end surface, and
the secondary phase material is disposed also on the side surface of the body.

14. A capacitor component comprising:
a body including a dielectric layer and an internal electrode exposed from an end surface of the body; and
an external electrode disposed on the end surface of the body,
wherein the external electrode comprises:
an electrode layer connected to the internal electrode and disposed on the end surface of the body;
a plating layer disposed on the electrode layer and disposed on the end surface of the body; and
a plurality of first patterns, made of a secondary phase material containing sulfur (S), disposed on the end surface of the body, and disposed between the electrode layer and the plating layer and spaced apart from each other, and
the sulfur (S) is contained in the secondary phase material as a compound with at least one selected from the group consisting of tin (Sn), copper (Cu), nickel (Ni), barium (Ba), aluminum (Al), silicon (Si), and oxygen (O).

15. The capacitor component of claim 14, wherein the electrode layer includes a conductive metal and a glass.

16. The capacitor component of claim 14, wherein the electrode layer includes a sintered electrode layer, including a conductive metal and a glass, and a conductive resin layer, disposed on the sintered electrode layer, including a conductive metal and a resin.

17. The capacitor component of claim 14, wherein the dielectric layer has a thickness of 0.4 micrometer or less, and the internal electrode has a thickness of 0.4 micrometer or less.

18. The capacitor component of claim 14, wherein the plurality of first patterns are randomly distributed between the electrode layer and the plating layer.

19. The capacitor component of claim 14, wherein the external electrode extends from the end surface of the body onto a side surface of the body connected to the end surface,
- the electrode layer extends from the end surface of the body onto a side surface of the body connected to the end surface;
- the plating layer extends from the end surface of the body onto a side surface of the body connected to the end surface; and
- the capacitor component further comprises a plurality of second patterns, made of the secondary phase material containing sulfur (S), disposed on the side surface of the body, and disposed between the electrode layer and the plating layer and spaced apart from each other.

* * * * *